United States Patent Office 2,841,475
Patented July 1, 1958

2,841,475
METHOD OF PRODUCING ALUMINUM CARBIDE

George A. Fischer, Fairmont, W. Va.

No Drawing. Application December 29, 1955
Serial No. 556,333

1 Claim. (Cl. 23—208)

This invention relates to a new and improved method for producing aluminum carbide, and while primarily intended for use in iron mixtures for producing iron castings, it will be obvious that the product may be used in any other metal mixtures wherein it is found to be applicable and advantageous.

In the early 1930 years, foundrymen depended on ferro-silicon, silvery pig iron, and nickel to obtain free machineability of casting from their mixtures. The amount of pig iron required with these ingredients was very expensive. In later years, foundrymen used silicon carbide or ferro-carbo and nickel. This gave good results with but a small saving in cost.

The important aims and advantages of my invention is to provide a new method for producing aluminum carbide, which, when used as an additive to iron mixtures, greatly reduces the cost of the iron mixtures, and assures results of easy machineability and at the same time produces casting products of closer or denser grain structures without gas holes, exides, or porosity.

Extensive experiments and tests over long periods of time have proved conclusively that the above-mentioned aims and advantages may be obtained by the use of aluminum carbide with 100% scrap iron in 1" to 2" sections, or by using 90% scrap iron and 10% pig iron, and 85% scrap iron and 15% pig iron in sections down to ⅛". Thus it will be evident that the cost of production of casting iron may be reduced as much as 25% of the cost of the present production methods, even in small foundries, by reducing the need of the expensive pig iron to a minimum.

I know that it is the common practice to use the metal ferro-aluminum as an additive to both iron and steel, but the research departments of large foundries in steel mills, report that, even with great care, they are still troubled with pin holes and gas holes in their products when using ferro-aluminum.

I have discovered that the addition of a relatively small amount of aluminum carbide to the cupola charge is effective to produce results and advantages not heretofore attainable by conventional cupola melting procedures and is superior, particularly from the standpoint of economy, to various special treatments which have been suggested and employed for the purpose of attaining results similar to those obtained by the present invention.

My method of producing aluminum carbide is as follows: By weight, four parts of powdered raw alumina, which is refined from the raw material of aluminum oxide or bauxite, are thoroughly admixed in a muller, with three parts of carbon, which comprises 50% carbon dust or flour and 50% coke breeze. A bond of cement and water in proper amounts is added to the admixture to produce a moldable compound, which is placed into steel molds and left to dry and harden by exposure to the air to thereby form briquettes preferably about 4" x 4" x 6" in dimensions. By air drying the expense of a heating operation for drying is eliminated.

About sixteen pounds of such briquettes per ton of metal are placed in the cupola stack directly on top of the coke layer beneath the iron charge and travels downward with the latter during the melting operation. The carbon ingredients of the briquettes tend to increase the temperature of the latter because the coke breeze is preheated in the cupola stack as the briquettes move downward toward the melting zone. Upon entering the melting zone the coke breeze and the carbon dust begin to increase in temperature and become incandescent as is the melting zone. This intense temperature of the briquettes begins to reduce the alumina, and since the alumina is one with the carbon conbination it is reduced to aluminum carbide.

As the aluminum carbide which has now been produced moves down through the coke bed it comes into contact with the metal that is dropping down through the coke bed and is slowly entering into the molten metal. The aluminum carbide is entirely absorbed in the metal reservoir and the impurities formed are taken off with the slag, leaving the metal free from harmful gases and oxides.

The following is a comparable analysis report, made by a reputable testing laboratory, of casting iron, one using ferro-aluminum and ferro-silicon, and the other using aluminum carbide:

|  | With use of ferro-aluminum and ferro-silicon, percent | With use of aluminum carbide, percent |
|---|---|---|
| Total Carbon | 2.60 | 2.44 |
| Graphic Carbon | 2.59 | 1.36 |
| Combined Carbon | .01 | 1.08 |
| Maganese | .79 | .30 |
| Phosphorus | .158 | .062 |
| Sulphur (Volumetric) | .063 | .075 |
| Silicon | 4.88 | 1.92 |
| Aluminum | 5.58 | .27 |

The iron made by the use of ferro-aluminum and ferro-silicon was very weak and shows a high percent of aluminum and silicon pickup, and further shows the carbon to be almost all in graphic form because the aluminum and silicon pickup are very high. This iron was very light gray in color and light in weight.

The iron made by the use of aluminum carbide shows a low carbon and very high strength iron when the aluminum pickup is comparatively lower.

It will here be noted that instead of bonding the admixture of alumina, carbon dust, and coke breeze into briquette form for use in the manner herein stated, the admixture, with a suitable bonding agent, may be formed into thin sheets, and after air drying the latter, these thin sheets may be broken into small pieces and charged directly into a crucible furnace.

The crucible furnace is then covered and the materials subjected to a temperature sufficiently high to reduce the admixture materials to a very dark slag. This slag is poured into very thin sheets, and after chilling, these sheets can be broken or crushed into pieces and any required size for commercial use and for any purpose wherein it is found to be applicable.

The present invention provides a most efficient method for producing aluminum carbide which may be successfully employed for the most economical production in iron mixtures in the manner and for the purposes herein set forth.

What I claim is:

A method for the production of aluminum carbide for an iron mixture, which consists in thoroughly mulling together by weight four parts of powdered alumina and three parts of carbon comprising fifty percent carbon flour and fifty percent coke breeze into a unitary admixture, in adding cement and water to the admixture to form a bonded mixture, in drying the mixture to solidify the latter, and then subjecting the solidified mixture to a temperature capable of reducing the mixture for absorption into a molten iron mixture.

References Cited in the file of this patent

UNITED STATES PATENTS

| | | |
|---|---|---|
| 975,306 | Wakefield | Nov. 8, 1910 |

FOREIGN PATENTS

| | | |
|---|---|---|
| 21,696 | Great Britain | 1892 |